(12) United States Patent
Jung et al.

(10) Patent No.: US 7,886,097 B2
(45) Date of Patent: Feb. 8, 2011

(54) BUS ARBITRATION SYSTEM, MEDIUM, AND METHOD

(75) Inventors: Seok-yoon Jung, Seoul (KR); Il-san Kim, Seoul (KR); Jin-hong Park, Seoul (KR); Tack-don Han, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 102 days.

(21) Appl. No.: 11/812,946

(22) Filed: Jun. 22, 2007

(65) Prior Publication Data

US 2008/0005435 A1    Jan. 3, 2008

(30) Foreign Application Priority Data

Jun. 23, 2006   (KR) ..................... 10-2006-0057126

(51) Int. Cl.
*G06F 13/40* (2006.01)
(52) U.S. Cl. ..................... 710/110; 710/66; 710/307
(58) Field of Classification Search ............. 710/66, 710/110, 307
See application file for complete search history.

(56) References Cited

U.S. PATENT DOCUMENTS

| | | | | |
|---|---|---|---|---|
| 4,385,350 A | * | 5/1983 | Hansen et al. ............... | 710/119 |
| 4,928,234 A | * | 5/1990 | Kitamura et al. ............. | 711/151 |
| 5,083,260 A | * | 1/1992 | Tsuchiya .................... | 710/113 |
| 5,195,089 A | * | 3/1993 | Sindhu et al. ............... | 370/235 |
| 5,327,538 A | * | 7/1994 | Hamaguchi et al. ......... | 710/107 |
| 5,345,566 A | * | 9/1994 | Tanji et al. ................... | 710/306 |
| 5,377,189 A | * | 12/1994 | Clark .......................... | 370/462 |
| 5,461,723 A | * | 10/1995 | Shah et al. ................... | 710/113 |
| 5,509,127 A | * | 4/1996 | Datwyler et al. ............. | 710/311 |
| 5,796,964 A | * | 8/1998 | Bass et al. ................... | 710/305 |
| 5,901,332 A | * | 5/1999 | Gephardt et al. .............. | 710/41 |
| 5,913,044 A | | 6/1999 | Tran et al. | |
| 5,925,118 A | * | 7/1999 | Revilla et al. ................ | 710/110 |
| 5,930,484 A | * | 7/1999 | Tran et al. .................... | 710/107 |
| 5,983,024 A | * | 11/1999 | Fye ............................ | 710/36 |
| 6,321,284 B1 | * | 11/2001 | Shinohara et al. ........... | 710/113 |
| 6,587,905 B1 | | 7/2003 | Correale et al. | |

(Continued)

FOREIGN PATENT DOCUMENTS

WO    2007/031912    3/2007

OTHER PUBLICATIONS

European Search Report issued Nov. 7, 2007 in corresponding European Patent Application No. 07105698.0-1229.

*Primary Examiner*—Paul R Myers
(74) *Attorney, Agent, or Firm*—Staas & Halsey LLP

(57) ABSTRACT

A bus arbitration system, medium, and method. The bus arbitration system can arbitrate access to a bus for a plurality of masters, requesting the use of a bus to which at least one slave is connected, and may include a bus use granting unit that outputs a plurality of bus grant signals for granting the use of the bus to the plurality of masters that request the use of the bus at the same time, a simultaneous processing available signal selecting unit that selects a predetermined number of operation instruction signals having a predetermined similarity, from among a plurality of operation instruction signals that are input from the masters, in response to the bus grant signals, and an operation instructing unit that simultaneously transmits the selected operation instruction signals to the slave through the bus.

11 Claims, 5 Drawing Sheets

U.S. PATENT DOCUMENTS 6,618,777 B1 * 9/2003 Greenfield .................. 710/120
7,032,046 B2 * 4/2006 Horii et al. .................. 710/113
7,085,875 B1 * 8/2006 Yona et al. .................. 710/307
2004/0220948 A1 * 11/2004 Whitaker .................... 707/100

* cited by examiner

BUS ARBITRATION SYSTEM, MEDIUM, AND METHOD

CROSS-REFERENCE TO RELATED APPLICATIONS

This application claims the benefit of Korean Patent Application No. 10-2006-0057126, filed on Jun. 23, 2006, in the Korean Intellectual Property Office, the disclosure of which is incorporated herein in its entirety by reference.

BACKGROUND OF THE INVENTION

1. Field of the Invention

One or more embodiments of the present invention relate to bus arbitration, and more particularly, to a bus arbitration system, medium, and method, by which a plurality of masters communicating with a bus can simultaneously instruct an operation of the same slave through the bus.

2. Description of the Related Art

In general, a bus arbiter performs bus arbitration between a plurality of masters connected to a bus. When the plurality of masters request the use of the bus at the same time, the bus arbiter grants the use of the bus to only one of the masters. Thus, only one of the masters can use the bus at a time according to the arbitration of the bus arbiter.

Due to a principle of bus arbitration, a data processor using a conventional bus structure spends an increasing amount of time in completing data processing corresponding to the increase in the number of masters that simultaneously request the use of the bus. This problem also gets worse when the plurality of masters connected to the bus are arranged in the form of a pipeline.

SUMMARY OF THE INVENTION

One or more embodiments of the present invention provide a bus arbitration system, medium, and method in which, when a plurality of masters desire to use a bus at the same time, bus grant signals are sent from a bus arbiter to the plurality of masters and a predetermined number of operation instruction signals are simultaneously sent, from the bus arbiter to at least one slave, having a predetermined similarly among operation instruction signals received from the plurality of masters in response to the bus grant signals.

Additional aspects and/or advantages of the invention will be set forth in part in the description which follows and, in part, will be apparent from the description, or may be learned by practice of the invention.

To achieve the above and/or other aspects and advantages, embodiments of the present invention include a bus arbitration system arbitrating access to a bus for a plurality of masters requesting use of the bus to which at least one slave is connected, the bus arbitration system including a bus use granting unit to output a plurality of bus grant signals for granting the use of the bus to the plurality of masters that request the use of the bus at the same time, a simultaneous processing available signal selecting unit to select a predetermined number of operation instruction signals having a predetermined similarity from among a plurality of operation instruction signals that are input from the masters in response to the bus grant signals and to instruct the slave to perform an operation, and an operation instructing unit to simultaneously transmit the selected predetermined number of operation instruction signals to the slave through the bus.

To achieve the above and/or other aspects and advantages, embodiments of the present invention include a bus arbitration method arbitrating access to a bus for a plurality of masters requesting use of the bus to which at least one slave is connected, the bus arbitration method including outputting a plurality of bus grant signals for granting the use of the bus to the plurality of masters that request the use of the bus at the same time, selecting a predetermined number of operation instruction signals having a predetermined similarity from among a plurality of operation instruction signals that are input from the masters in response to the bus grant signals and which instruct the slave to perform an operation, and simultaneously transmitting the selected predetermined number of operation instruction signals to the slave through the bus.

To achieve the above and/or other aspects and advantages, embodiments of the present invention include at least one medium including computer readable code to control at least one processing element to implement a bus arbitration method of arbitrating access to a bus for a plurality of masters requesting use of the bus to which at least one slave is connected, the bus arbitration method including outputting a plurality of bus grant signals for granting the use of the bus to the plurality of masters that request the use of the bus at the same time, selecting a predetermined number of operation instruction signals having a predetermined similarity from among a plurality of operation instruction signals that are input from the masters in response to the bus grant signals and which instruct the slave to perform an operation, and simultaneously transmitting the selected predetermined number of operation instruction signals to the slave through the bus.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
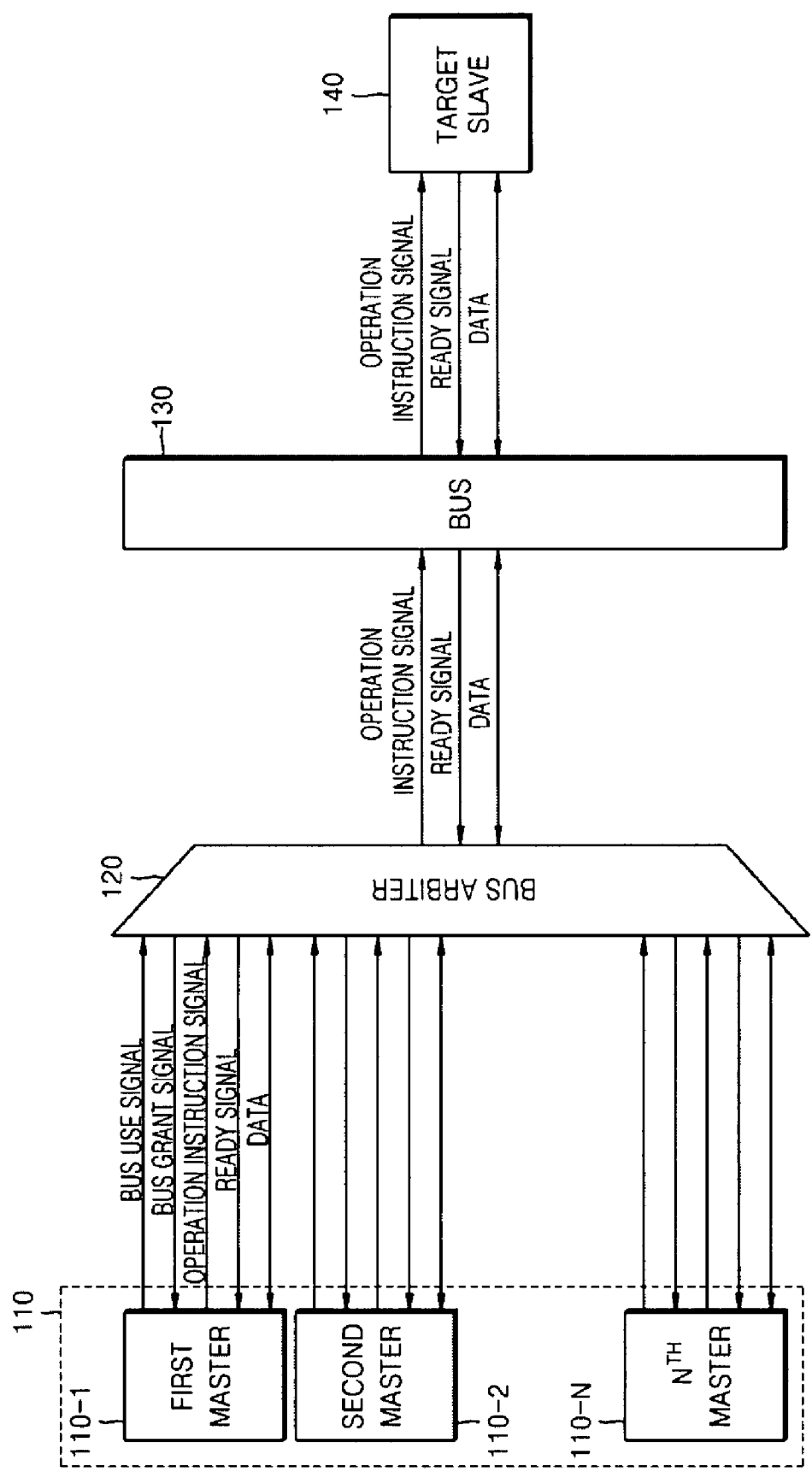
FIG. 1 illustrates a system implementing bus arbitration, according to an embodiment of the present invention.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 2:
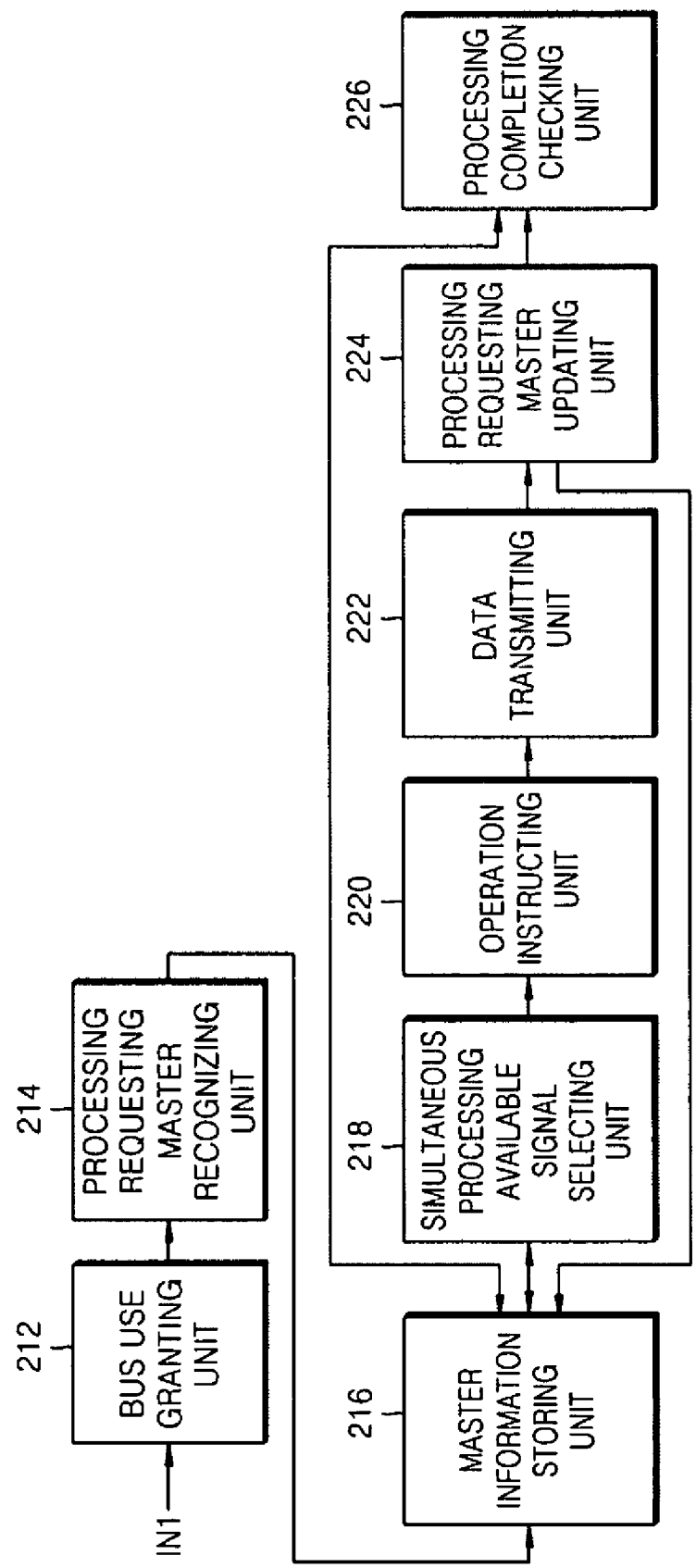
FIG. 2 illustrates a bus arbiter, according to an embodiment of the present invention.

FIG. 1 illustrates a system implementing bus arbitration, according to an embodiment of the present invention. In addition, FIG. 2 illustrates a bus arbiter, according to an embodiment of the present invention. Below, an initial description of one or more embodiments of the present invention will be explained with references to FIGS. 1 and 2.

For convenience of explanation, it will be assumed that a plurality of masters 110 and at least one slave are connected to a bus 130. Here, the described plurality of masters 110 means object(s) that instructs the at least one slave to perform one or more operations, and the described at least one slave means an object that operates according to such instructions from the plurality of masters 110. Accordingly, as illustrated in FIG. 1, one or more masters 110 can exchange data with at least a single slave through the bus 130.

At this time, the illustrated plurality of masters 110 include N masters, with N being an integer greater than 2. For example, as shown in FIG. 1, the plurality of masters 110 may include a first master 110-1 through an $N^{th}$ master 110-N. Below, for simplicity of explanation, references to master 110 may reference all of the plurality of masters or just a single master.

The illustrated at least one slave 140 can be represented by M slaves, with M being a natural number. For example, the at least one slave 140 can include a first slave through an $M^{th}$ slave. Similar to above, for simplicity of explanation, references to the at least one slave 140 references a single target slave or multiple target slaves. As illustrated in FIG. 1, the single illustrated target slave 140 corresponds to one of the M slaves that the master 10 desires to operate. The target slave 140 may differ according to the particular master 110. For example, if the first master 110-1 desires to operate a third slave, the target slave 140 of the first master 110-1 can be considered to be the third slave. Similarly, if a fourth master 110-4 desires to operate a second slave, the target slave 140 of the fourth master 110-4 can be considered to be the second slave.

For convenience of explanation, it is assumed that all the slaves connected to the bus 130 are implemented with memory devices like memory, noting that alternative embodiments are equally available. In such a case, data can be stored in the slaves while being matched with respective addresses. In other words, a master 110 instructing of an operation of the slave may mean that the master 110 notifies the slave as to which address of the slave data should be written to or an address of the slave from which data may be read.

As noted above, the plurality of masters 110 may request the use of the bus 130 at the same time.

More specifically, each of the masters 110 may output a bus request signal to a bus arbiter 120, and the bus arbiter 120 may receive the bus request signal from each of the masters 110. In other words, the bus arbiter 120 can simultaneously receive the plurality of bus request signals, with the bus request signals each containing information requesting the use of the bus 130.

Briefly, as illustrated in FIG. 2, in such a case, a bus use granting unit 212 may generate a bus grant signal for each of the bus request signals input through an input terminal IN1 and output the generated bus grant signal to each of the masters 110. In other words, the bus use granting unit 212 may grant the use of the bus to all the masters 110, for example. Here, the bus grant signal contains information granting the use of the bus 130. In addition, the bus use granting unit 212 may be implemented on or separately from the bus arbiter 120, for example.

As such, the operation of the bus arbiter 120 according to an embodiment of the present invention is different from that of a conventional bus arbiter in that the bus arbiter 120 grants the use of the bus 130 to all the masters 110 when the masters 110 request the use of the bus 130 at the same time. Conversely, as mentioned above, the conventional bus arbiter outputs a bus grant signal to each respective master according to a predetermined order when the masters request the use of a bus at the same time.

Thus, according to an embodiment of the present invention, upon receipt of the bus grant signal from the bus arbiter 120, the master 110 outputs an operation instruction signal to the bus arbiter 120. The operation instruction signal contains information about which one of the slaves connected to the bus 130 is the target slave 140 and which operation the target slave 140 is to perform. If the operation instruction signal is for instructing the target slave 140 to perform a write operation, it may contain information about which address of the target slave 140 data is to be written. Similarly, if the operation instruction signal is for instructing the target slave 140 to perform a read operation, it may contain information about from which address of the target slave 140 data is to be read. Again, here, it is noted that alternative slave operations may also be available in differing embodiments.

A processing requesting master recognizing unit 214 may further recognize the respective masters 110 that have input and output operation instruction signals. A master information storing unit 216 may still further store information about the operation instruction signals of the recognized masters 110. In one embodiment, the master information storing unit 216 may be implemented with a register, noting that alternative embodiments are equally available.

In an example where the number of masters (N) is 15, it can further be assumed that a first master 110-1 through fifteenth master 110-15 output bus use signals, while only the first master 110-1, a third master 110-3, a fourth master 110-4, an eighth master 110-8, a ninth master 110-9, a tenth master 110-10, a twelfth master 110-12, a thirteenth master 110-13, a fourteenth master 110-14, and a fifteenth master 110-15 output operation instruction signals. These output operation instruction signals will respectively be referred to as a first operation instruction signal, a third operation instruction signal, a fourth operation instruction signal, an eighth operation instruction signal, a ninth operation instruction signal, a tenth operation instruction signal, a twelfth operation instruction signal, a thirteenth operation instruction signal, a fourteenth operation instruction signal, and a fifteenth operation instruction signal.

In this case, the master information storing unit 216 may store information about the first operation instruction signal, the third operation instruction signal, the fourth operation instruction signal, the eighth operation instruction signal, the ninth operation instruction signal, the tenth operation instruction signal, the twelfth operation instruction signal, the thirteenth operation instruction signal, the fourteenth operation instruction signal, and the fifteenth operation instruction signal.

Thus, in an embodiment, the simultaneous processing available signal selecting unit 218 may select a predetermined number of operation instruction signals corresponding to a predetermined similarity from among the operation instruction signals input to the processing requesting master recognizing unit 214. With the above example, the simultaneous processing available signal selecting unit 218 may select a predetermined number of operation instruction signals corresponding to a predetermined similarity from among the first operation instruction signal, the third operation instruction signal, the fourth operation instruction signal, the eighth operation instruction signal, the ninth operation instruction signal, the tenth operation instruction signal, the twelfth operation instruction signal, the thirteenth operation instruction signal, the fourteenth operation instruction signal, and the fifteenth operation instruction signal.

Hereinafter, according to one embodiment, this referenced predetermined number of operation instruction signals will be described in greater detail. Here, the predetermined number is equal to or less than a result of a dividing of the data width of the bus 130 by the basic unit of the width of data that can be input to and output from the slave. For example, it can be assumed that the data width of the bus 130 is A bits and the basic unit of the width of data that can be input/output to/from the slave is B bits. In other words, data written to or read from the slave is composed of B bits.

Here, the assumption that the basic unit is B bits has been applied to all slaves, for example. In addition, the expression of the basic unit has been used because, since a plurality of discrete data can be transmitted through the bus 130 at the same time, the number of discrete data that can be input to and output from the slave at the same time may also be plural. Even when the number of discrete data that can be input to and output from the slave at the same time is 3, for example, the predetermined number of operation instruction signals is less than a result of dividing A bits by B bits instead of a result of dividing A bits by 3B bits.

Simultaneous transmission of a plurality of discrete data through the bus 130 can be achieved when A bits exceed B bits. It may, thus, be preferable that A=k*B (with k being an integer that is greater than 2).

Here, k may be calculated by a number calculating unit (not shown) or the simultaneous processing available signal selecting unit 218 prior to the operation of the bus use granting unit 212, for example. In other words, such a number calculating unit or the simultaneous processing available signal selecting unit 218 may identify A and B and determines the quotient of A divided by B to be k.

In this embodiment, the predetermined number of operation instructions is less than k.

More specifically, if the simultaneous processing available signal selecting unit 218, for example, selects the predetermined number of operation instruction signals without considering the above mentioned similarities between operation instruction signals, as described below, the predetermined number of operation instructions can be set to be k. On the other hand, if the simultaneous processing available signal selecting unit 218 selects such a predetermined number of operation instruction signals having a predetermined similarity, set the predetermined number may be set to be equal to or less than k.

Thus, in an embodiment, a value calculated by the number calculating unit or the simultaneous processing available signal selecting unit 218 may not be the identified predetermined number, but may merely be k. Here, the predetermined number may not be obtained by calculation, and may, thus, be determined/set when the simultaneous processing available signal selecting unit 218 completes a selection.

Hereinafter, the aforementioned predetermined similarity will be described in greater detail.

In an embodiment, the simultaneous processing available signal selecting unit 218 may select a plurality of operation instruction signals instructing a same operation from among all the operation instruction signals input to the processing requesting master recognizing unit 214. For example, if each of the aforementioned first operation instruction signal, the fourth operation instruction signal, the eighth operation instruction signal, the ninth operation instruction signal, the thirteenth operation instruction signal, and the fourteenth operation instruction signal instructs a write operation and each of the third operation instruction signal, the tenth operation instruction signal, the twelfth operation instruction signal, and the fifteenth operation instruction signal instructs a read operation, the simultaneous processing available signal selecting unit 218 may select one of the first operation instruction signal, the fourth operation instruction signal, the eighth operation instruction signal, the ninth operation instruction signal, the thirteenth operation instruction signal, and the fourteenth operation instruction signal and the third operation instruction signal, the tenth operation instruction signal, the twelfth operation instruction signal, and the fifteenth operation instruction signal.

In an embodiment, the simultaneous processing available signal selecting unit 218 may select a plurality of operation instruction signals that are for controlling operations of a same target slave 140 from among all the operation instruction signals input to the processing requesting master recognizing unit 214. For example, if a respective target slave 140 of the first operation instruction signal, the fourth operation instruction signal, the eighth operation instruction signal, and the ninth operation instruction signal is considered to be a first slave, a respective target slave 140 of the third operation instruction signal, the twelfth operation instruction signal, and the fifteenth operation instruction signal is considered to be a third slave, and a respective target slave 140 of the thirteenth operation instruction signal and the fourteenth operation instruction signal is considered to be a fourth slave, the simultaneous processing available signal selecting unit 218 may select collectively the first operation instruction signal, the fourth operation instruction signal, the eighth operation instruction signal, and the ninth operation instruction signal, collectively the third operation instruction signal, the twelfth operation instruction signal, and the fifteenth operation instruction signal, or collectively the thirteenth operation instruction signal and the fourteenth operation instruction signal.

In an embodiment, the simultaneous processing available signal selecting unit 218 may still further select a plurality of operation instruction signals that are for controlling operations of adjacent, for example, addresses of a same slave. More specifically, the simultaneous processing available signal selecting unit 218 may select k operation instruction signals corresponding to k addresses from among a plurality of addresses for which a plurality of respective operation instruction signals that are for controlling operations of the same target slave 140, such that the k addresses are sequentially adjacent.

In the above example, if "k" is 3 and a fourth address, e.g., for a $p^{th}$ address that may be an address among addresses of the target slave 140 in which a $p^{th}$ operation instruction signal instructs the target slave 140 to perform a write operation or from which the $p^{th}$ operation instruction signal instructs the target slave 140 to perform a read operation, is adjacent to a ninth address, the ninth address is adjacent to a first address, and the first address is adjacent to an eighth address, of the target slave 140 corresponding to a fourth operation instruction signal, the simultaneous processing available signal selecting unit 218 may select collectively the fourth operation instruction signal, the ninth operation instruction signal, and the first operation instruction signal. Although the selection of which operation instruction signals should be selected has been based on the fourth address referenced by the corresponding fourth operation instruction signal, such selection of operation instruction signals may be considered based on the first address, the eighth address, or the ninth address, for example. In this example embodiment, the predetermined number has been considered as being 3.

Similarly, in the above example, if k is 2 and the twelfth address is adjacent to the third address and the third address is adjacent to the fifteenth address, corresponding to a twelfth operation instruction signal, the simultaneous processing available signal selecting unit 218 may collectively select the twelfth operation instruction signal and the third operation instruction signal, potentially with the third operation instruction signal being closest to the twelfth address. Again, although selection of which operation instruction signals should be selected has been based on the twelfth address, such selection of operation instruction signals may be considered based on the third address or the fifteenth address, for example. In this example embodiment, the predetermined number has been considered as being 2.

The simultaneous processing available signal selecting unit 218 may, thus, output a predetermined number of operation instruction signals selected according to this principle to an operation instructing unit 220.

The operation instructing unit 220 may simultaneously transmit such predetermined number of operation instruction signals received from the simultaneous processing available signal selecting unit 218 to the target slave 140 through the bus 130. Here, depending on embodiment, the operation instructing unit 220 may be implemented on or separately from the bus arbiter 120.

If the target slave 140 receiving the predetermined number of operation instruction signals is ready for performing the operation instructed by the operation instruction signals, the target slave 140 may transmit a ready signal to a data transmitting unit 222 through the bus 130. In this case, the data transmitting unit 222 may transmit the received ready signal to the master 110. In this way, the master 110 receiving the ready signal can recognize that an exchange of data can be commenced with the target slave 140. Depending on embodiment, the data transmitting unit 222 may or may not be implemented on the bus arbiter 120.

Once the ready signal is transmitted to the master 110, the master 110 may then transmit corresponding data to the target slave 140 through the bus 130.

In the above example, if the simultaneous processing available signal selecting unit 218 selects the fourth operation instruction signal, the ninth operation instruction signal, and the first operation instruction signal, for example, the first master 110-1, the fourth master 110-4, and the ninth master 110-9 receiving the ready signal may then control the first slave to write data in 3 addresses at the same time.

In an embodiment, a processing requesting master updating unit 224 may then eliminate information about an operation instruction signal corresponding to the generated ready signal from the master information storing unit 216, for example.

In addition, a processing completion checking unit 226 may check whether there remains information about an operation instruction signal in the master information storing unit 216. If so, the processing completion checking unit 226 may further instruct the simultaneous processing available signal selecting unit 218 to perform the operation again.

Figure 3:
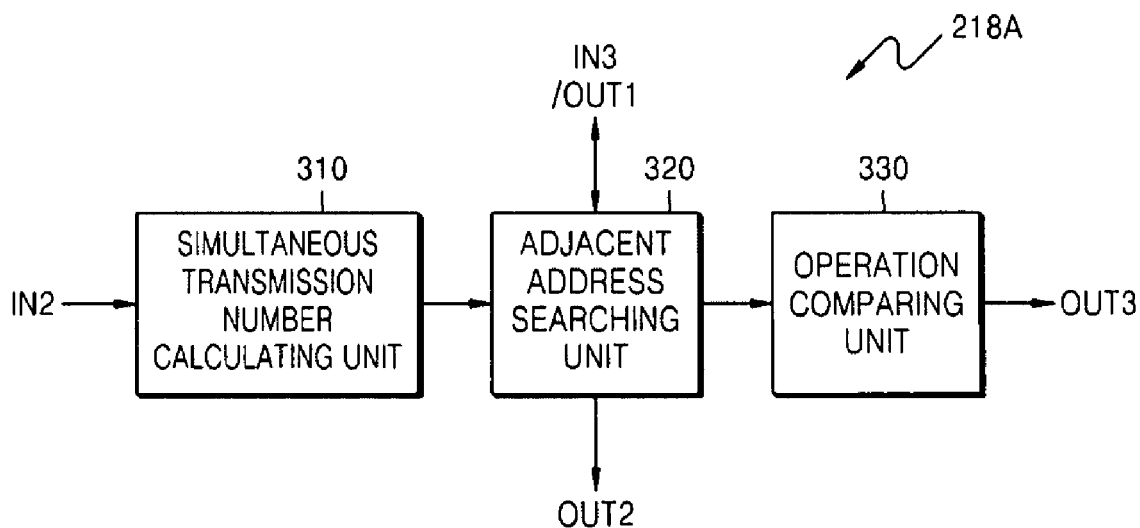
FIG. 3 illustrates a simultaneous processing applicable signal selecting unit, such as that illustrated in FIG. 2, according to an embodiment of the present invention.

FIG. 3 illustrates a simultaneous processing available signal selecting unit 218A, such as the simultaneous processing available signal selecting unit 218 illustrated in FIG. 2, according to an embodiment of the present invention. The simultaneous processing available signal selecting unit 218A may include a simultaneous transmission number calculating unit 310, an adjacent address searching unit 320, and an operation comparing unit 330, for example.

The simultaneous transmission number calculating unit 310 may recognize A and B and calculates k using the recognized A and B. Here, A and B may be input to the simultaneous transmission number calculating unit 310 through an input terminal IN 2, for example.

The adjacent address searching unit 320 may analyze information stored in the master information storing unit 216, for example, to recognize the maximum number of k operation instruction signals corresponding to the maximum number of k addresses among a plurality of addresses corresponding to a plurality of operation instruction signals that are for controlling the same target slave 140, such that an operation instruction signal corresponding to an address that is sequentially adjacent, for example, to one of the plurality of addresses is included as one of the k addresses. Here, an input terminal IN 3, for example, may be included in the adjacent address searching unit 320 and an output terminal OUT1 may be included in the master information storing unit 216.

The adjacent address searching unit 320 may, thus, determine a maximum number of k operation instruction signals to be operation instruction signals to be selected by the simultaneous processing available signal selecting unit 218A and may output the k operation instruction signals to the operation instructing unit 220 through an output terminal OUT2, for example. In this case, the operation comparing unit 330 may not be needed or operated.

The operation comparing unit 330 may further select at least one operation instruction signal instructing the same type of operation as an operation instructed by one of the k operation instruction signals and output selected operation instruction signals to the operation instructing unit 220 through an output terminal OUT3, for example. In this case, the adjacent address searching unit 320 may not output the k operation instruction signals to the operation instructing unit 220 through the output terminal OUT2, for example.

Figure 4:
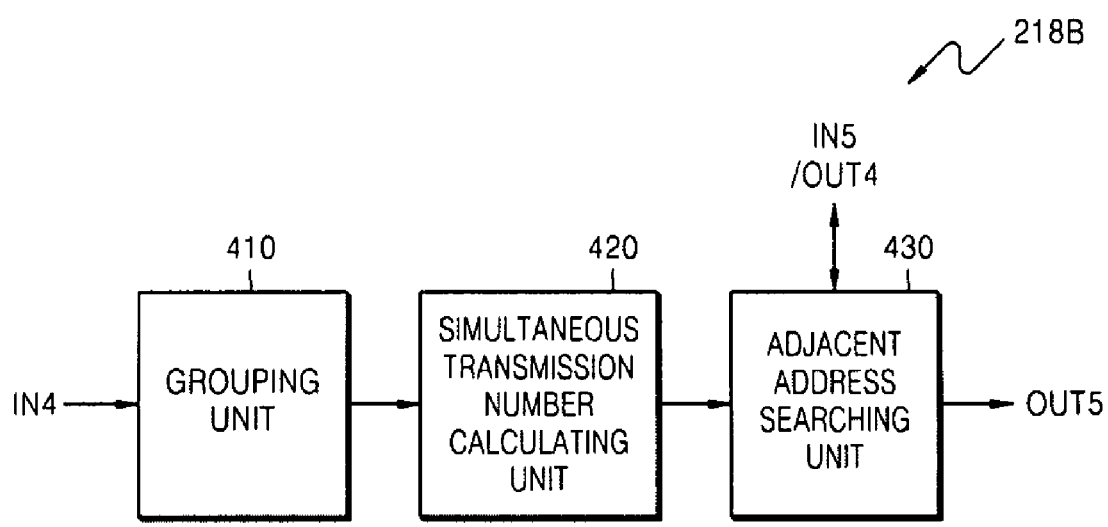
FIG. 4 illustrates a simultaneous processing applicable signal selecting unit, again such as illustrated in FIG. 2, according to an embodiment of the present invention.

FIG. 4 illustrates a simultaneous processing applicable signal selecting unit 218B, such as the simultaneous processing applicable signal selecting unit 218 illustrated in FIG. 2, according to an embodiment of the present invention. The simultaneous processing applicable signal selecting unit 218B may include a grouping unit 410, a simultaneous transmission number calculating unit 420, and an adjacent address searching unit 430, for example.

The grouping unit 410 may generate at least one group, according to the target device 140 whose operation the operation instruction signals recognized by the processing requesting master recognizing unit 214 correspond to and/or differing operations for each corresponding target device 140, such as separate write or read operation. At this time, the operation instruction signals recognized by the processing requesting master recognizing unit 214 may be input through an input terminal IN4, for example.

The simultaneous transmission number calculating unit 420 may, thus, recognize A and B and calculate k using A and B.

The adjacent address searching unit 430 may analyze information stored in the master information storing unit 216 to select the predetermined number of operation instruction signals corresponding to the predetermined number of addresses among the plurality of addresses corresponding to operation instruction signals included in one of the groups generated by the grouping unit 410 so that an address that is sequentially adjacent, for example, to one of the plurality of addresses is included in the predetermined number of addresses. An input terminal IN5 may be included in the adjacent address searching unit 320 and an output terminal OUT4 may be included in the master information storing unit 216, for example. The adjacent address searching unit 430 may further output the selected operation instruction signals to the operation instructing unit 220 through the output terminal OUT5, for example.

Figure 5:
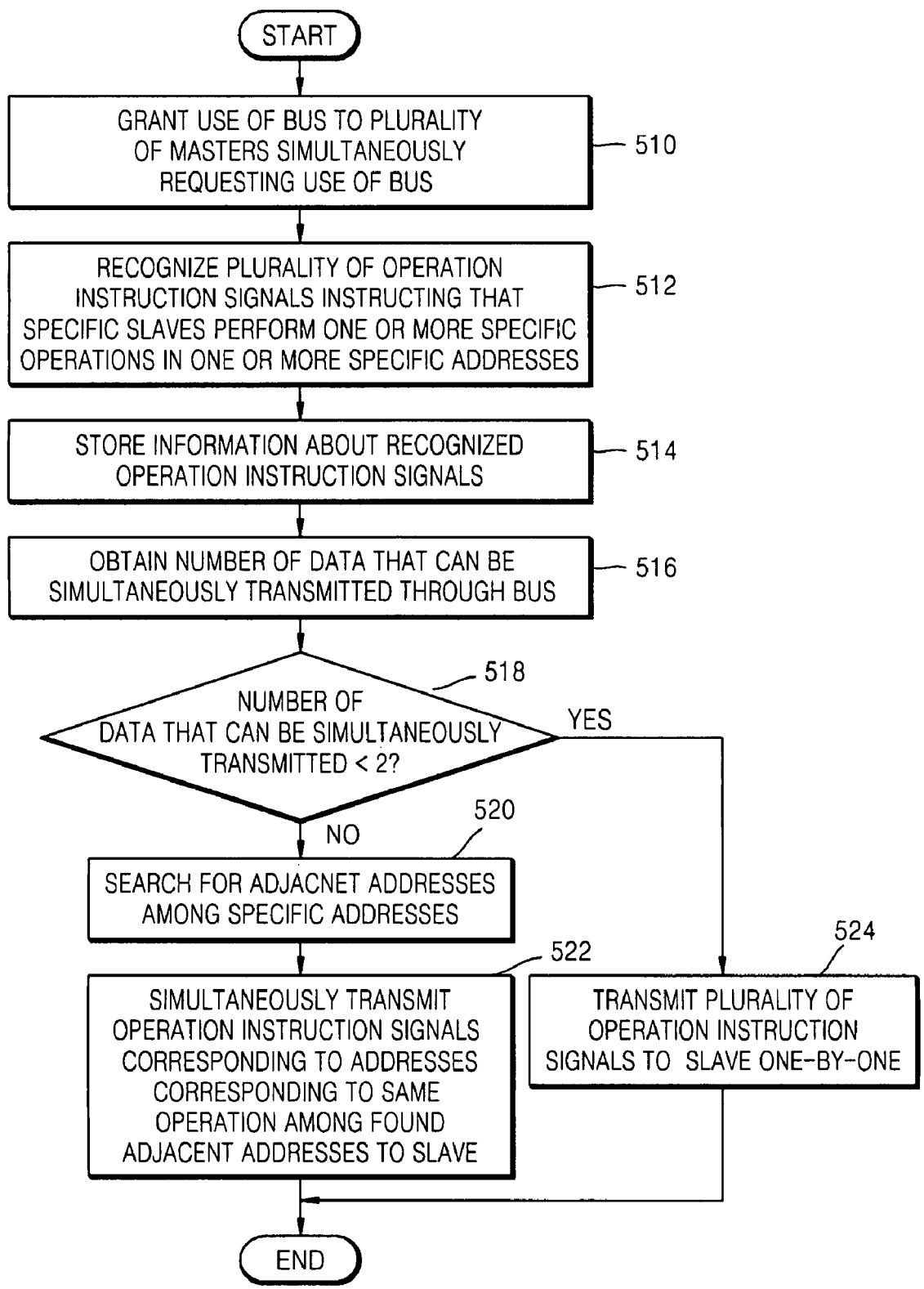
FIG. 5 illustrates a bus arbitration method, according to an embodiment of the present invention.

FIG. 5 illustrates a bus arbitration method, according to an embodiment of the present invention, in which when a plurality of masters attempt to use a bus at the same time, bus grant signals can be sent to all the masters and a predetermined number of operation instruction signals having a same slave or a same type of operation for the slave, from among operation instruction signals received from the masters, in response to the bus grant signals are transmitted to a slave through the bus at the same time.

The use of the bus 130 may be granted to all the masters 110 that request the use of the bus 130 at the same time, e.g., by the bus use granting unit 212, in operation 510. Masters that generate operation instruction signals may further be recognized, e.g., by the processing requesting master recognizing unit 214, in operation 512.

In operation 514, information about the operation instruction signals recognized in operation 512 may further be stored, e.g., by the master information storing unit 216.

The aforementioned k may then be obtained, in operation 516, and it may be determined whether k is less than 2, in operation 518, e.g., by the simultaneous transmission number calculating unit 310.

If k is greater than 2, operation instruction signals recognized in operation 512 may be searched for, e.g., by the adjacent address searching unit 320, a maximum number of k operation instruction signals corresponding to a maximum number of k addresses among a plurality of addresses corresponding to a plurality of operation instruction signals for controlling the same target device so that an address that is sequentially adjacent, for example, to one of the plurality of addresses is included first in the k addresses, in operation 520.

At least one operation instruction signals instructing a same target slave to control the same type of operation as an operation instructed by one of the operation instruction signals found in operation 520 may be selected and the operation instructing unit 220 may further simultaneously transmit the selected operation instruction signals to the target slave 140 through the bus 130 in operation 522.

If k is less than 2, the operation instruction signals recognized in operation 512 may separately be transmitted to the target slave 140, e.g., according to a conventional arbitration scheme. In other words, if k is less than 2, the bus arbiter 120 may transmit the operation instruction signals recognized in operation 512 to the target slave 140 through the bus 130 one-by-one, in operation 524.

Figure 6:
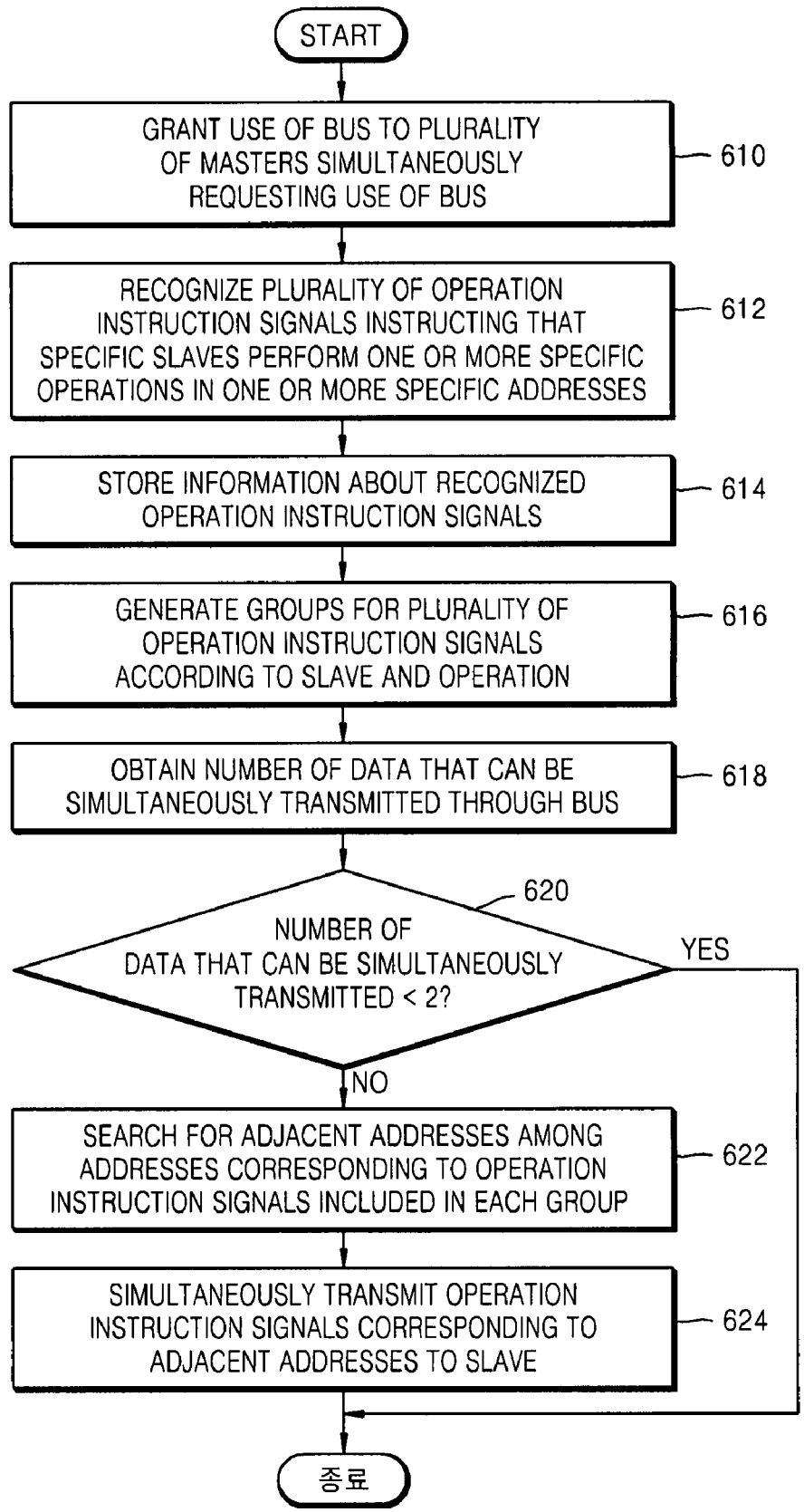
FIG. 6 illustrates a bus arbitration method, according to an embodiment of the present invention.

FIG. 6 illustrates a bus arbitration method, according to an embodiment of the present invention, in which when a plurality of masters attempt to use a bus at the same time, bus grant signals can be sent to all the masters and a predetermined number of operation instruction signals having a same slave or a same type of operation for the slave, from among operation instruction signals received from the masters in response to the bus grant signals, and transmitted to a slave through the bus at the same time.

The use of the bus 130 may be granted to all the masters 110 that request the use of the bus 130 at the same time, e.g., by the bus use granting unit 212, in operation 610. Masters that generate operation instruction signals may further be recognized, e.g., by the processing requesting master recognizing unit 214, in operation 612.

In operation 614, information about the operation instruction signals recognized in operation 612 may be stored, e.g., by the master information storing unit 216.

At least one group for the operation instruction signals recognized in operation 612 may be generated, e.g., by the grouping unit 410, based on the respective target device 140 whose operation the respective recognized operation instruction signals correspond to and/or differing operations for each corresponding target device 140, such as separate write or read operation, in operation 616.

The above mentioned k may further be obtained, in operation 618, and whether k is less than 2 may be determined, in operation 620, e.g., by the simultaneous transmission number calculating unit 420.

If k is greater than 2, a predetermined number of operation instruction signals corresponding to a predetermined number of addresses among a plurality of addresses corresponding to a plurality of operation instruction signals included in one of the groups generated in operation 616 may be searched for, such that an address that is sequentially adjacent to one of the plurality of addresses is included in a predetermined number of addresses, in operation 622.

In operation 624, the operation instruction signals selected in operation 622 may then be simultaneously transmitted to the target slave 140, e.g., by the operation instructing unit 220.

In addition to the above described embodiments, embodiments of the present invention can also be implemented through computer readable code/instructions in/on a medium, e.g., a computer readable medium, to control at least one processing element to implement any above described embodiment. The medium can correspond to any medium/media permitting the storing and/or transmission of the computer readable code.

The computer readable code can be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, according to one or more embodiments of the present invention, a plurality of masters can instruct an operation of a slave through a bus at the same time, thereby maximizing the amount of data transmission through the bus and thus maximizing the data processing speed of a data processor using the bus structure. Therefore, according to one or more embodiments of the present invention, it is possible to minimize rapid degradation in the data processing speed of a data processor having such a bus structure in which a plurality of masters connected to a bus are arranged in the form of a pipeline.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A bus arbitration system arbitrating access to a bus for a plurality of masters requesting use of the bus to which at least one slave is connected, the bus arbitration system comprising:
   a bus use granting unit to output a plurality of bus grant signals for granting the use of the bus to the plurality of masters that simultaneously request the use of the bus;
   a simultaneous processing available signal selecting unit to select a predetermined number of operation instruction signals having a predetermined similarity from among a plurality of operation instruction signals that are input from the masters in response to the bus grant signals and to instruct the slave to perform an operation within a capacity of the bus for simultaneous transmitting, wherein the predetermined number is greater than two and is equal to or less than a result of dividing a data width of the bus by a basic unit of width of data that can be at least one of input to or output from the slave; and an operation instructing unit to simultaneously transmit the selected predetermined number of operation instruction signals to the slave through the bus, wherein the predetermined similarity comprises one of operation instruction signals for controlling a same slave and operation instruction signals for controlling a same type of operation for the same slave, the same type of operation being one of a read operation and a write operation.

2. The bus arbitration system of claim 1, wherein the predetermined number is an integer greater than two.

3. The bus arbitration system of claim 1, wherein the simultaneous processing available signal selecting unit selects the predetermined number of operation instruction signals from the plurality of operation instruction signals to identify operation instruction signals instructing a performance of a same type of operation.

4. A bus arbitration system arbitrating access to a bus for a plurality of masters requesting use of the bus to which at least one slave is connected, the bus arbitration system comprising:

a bus use granting unit to output a plurality of bus grant signals for granting the use of the bus to the plurality of masters that simultaneously request the use of the bus;

a simultaneous processing available signal selecting unit to select a predetermined number of operation instruction signals having a predetermined similarity from among a plurality of operation instruction signals that are input from the masters in response to the bus grant signals and to instruct the slave to perform an operation within a capacity of the bus for simultaneous transmitting, wherein the predetermined number is greater than two and is equal to or less than a result of dividing a data width of the bus by a basic unit of width of data that can be at least one of input to or output from the slave; and an operation instructing unit to simultaneously transmit the selected predetermined number of operation instruction signals to the slave through the bus, wherein the predetermined similarity comprises one of operation instruction signals for controlling a same slave and operation instruction signals for controlling a same type of operation for the same slave, the same type of operation being one of a read operation and a write operation, and wherein the simultaneous processing available signal selecting unit selects the predetermined number of operation instruction signals from the plurality of operation instruction signals to identify operation instruction signals for controlling a same slave.

5. The bus arbitration system of claim 4, wherein the identified operation instruction signals respectively instruct a write operation or a read operation at respective addresses of the same slave, and the simultaneous processing available signal selecting unit selects the predetermined number of operation instruction signals from the identified operation instruction signals by considering the respective addresses of the identified operation instruction signals, so that the predetermined number of operation instruction signals are chosen based on proximity between the respective addresses.

6. A bus arbitration method arbitrating access to a bus for a plurality of masters requesting use of the bus to which at least one slave is connected, the bus arbitration method comprising:

outputting a plurality of bus grant signals for granting the use of the bus to the plurality of masters that simultaneously request the use of the bus;

selecting a predetermined number of operation instruction signals having a predetermined similarity from among a plurality of operation instruction signals that are input from the masters in response to the bus grant signals and which instruct the slave to perform an operation within a capacity of the bus for simultaneous transmitting, wherein the predetermined number is greater than two and is equal to or less than a result of dividing a data width of the bus by a basic unit of width of data that can be at least one of input to or output from the slave; and simultaneously transmitting the selected predetermined number of operation instruction signals to the slave through the bus, wherein the predetermined similarity comprises one of operation instruction signals for controlling a same slave and operation instruction signals for controlling a same type of operation for the same slave, the same type of operation being one of a read operation and a write operation.

7. The bus arbitration method of claim 6, wherein the predetermined number of operation instruction signals is an integer greater than two.

8. The bus arbitration method of claim 6, wherein the selecting of the predetermined number of operation instruction signals comprises selecting the predetermined number of operation instruction signals from the plurality of operation instruction signals to identify operation instruction signals instructing a performance of a same type of operation.

9. A bus arbitration method arbitrating access to a bus for a plurality of masters requesting use of the bus to which at least one slave is connected, the bus arbitration method comprising:

outputting a plurality of bus grant signals for granting the use of the bus to the plurality of masters that simultaneously request the use of the bus;

selecting a predetermined number of operation instruction signals having a predetermined similarity from among a plurality of operation instruction signals that are input from the masters in response to the bus grant signals and which instruct the slave to perform an operation within a capacity of the bus for simultaneous transmitting, wherein the predetermined number is greater than two and is equal to or less than a result of dividing a data width of the bus by a basic unit of width of data that can be at least one of input to or output from the slave; and simultaneously transmitting the selected predetermined number of operation instruction signals to the slave through the bus, wherein the predetermined similarity comprises one of operation instruction signals for controlling a same slave and operation instruction signals for controlling a same type of operation for the same slave, the same type of operation being one of a read operation and a write operation, and wherein the selecting of the predetermined number of operation instruction signals comprises selecting the predetermined number of operation instructions signals from the plurality of operation instruction signals to identify operation instruction signals for controlling a same slave.

10. The bus arbitration method of claim 9, wherein the identified operation instruction signals respectively instruct a write operation or a read operation at respective addresses of the same slave, and the selecting of the predetermined number of operation instruction signals comprises selecting the predetermined number of operation instruction signals from the identified operation instruction signals by considering the respective addresses of the identified operation instruction signals, so that the predetermined number of operation instruction signals are chosen based on proximity between the respective addresses.

11. At least one medium comprising computer readable code to control at least one processing element to implement a bus arbitration method of arbitrating access to a bus for a plurality of masters requesting use of the bus to which at least one slave is connected, the bus arbitration method comprising:

outputting a plurality of bus grant signals for granting the use of the bus to the plurality of masters that simultaneously request the use of the bus;

selecting a predetermined number of operation instruction signals having a predetermined similarity from among a plurality of operation instruction signals that are input from the masters in response to the bus grant signals and which instruct the slave to perform an operation within a capacity of the bus for simultaneous transmitting, wherein the predetermined number is greater than two and is equal to or less than a result of dividing a data width of the bus by a basic unit of width of data that can be at least one of input to or output from the slave; and simultaneously transmitting the selected predetermined number of operation instruction signals to the slave through the bus, wherein the predetermined similarity comprises one of operation instruction signals for controlling a same slave and operation instruction signals for controlling a same type of operation for the same slave, the same type of operation being one of a read operation and a write operation.

* * * * *